Feb. 21, 1967  U. H. MARTENSEN  3,305,030
PLOW BOTTOM POSITIONER
Filed Jan. 11, 1965
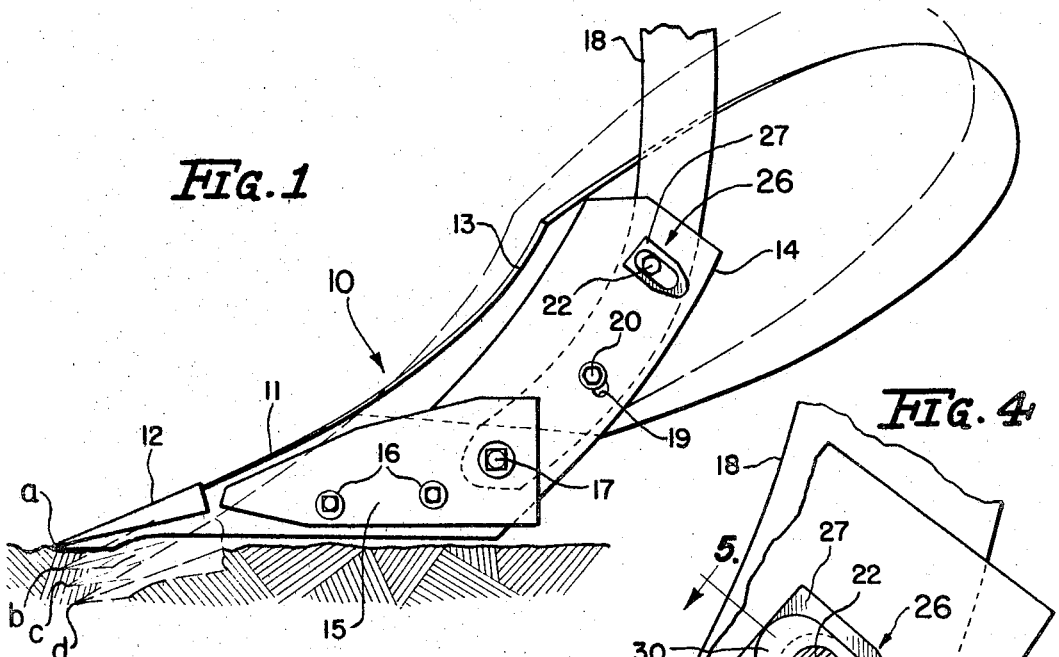
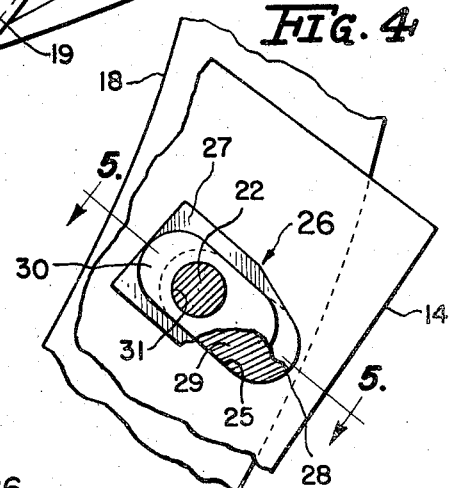
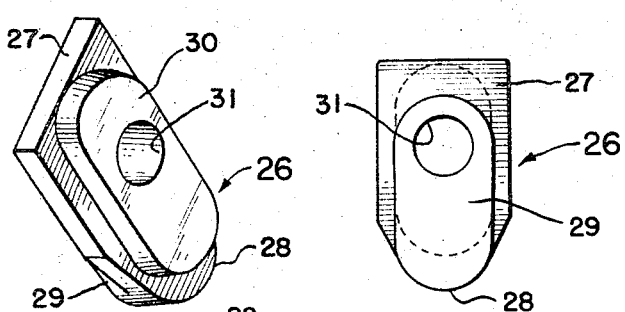
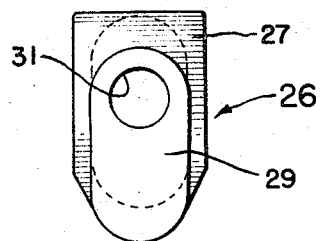
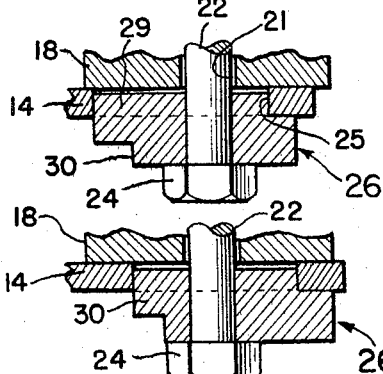
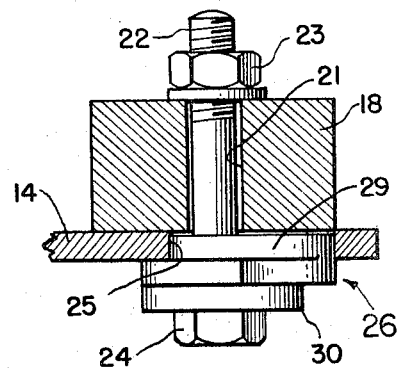
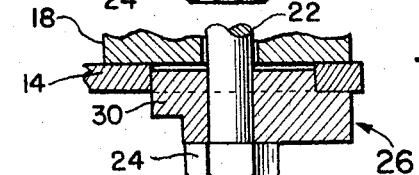
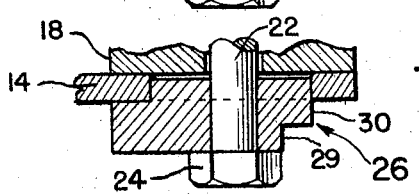
INVENTOR.
Uwe H. Martensen
J K McneIll
Atty.

United States Patent Office 3,305,030
Patented Feb. 21, 1967

3,305,030
PLOW BOTTOM POSITIONER
Uwe H. Martensen, Acassuso, Buenos Aires, Argentina, assignor to International Harvester Company, Chicago, Ill., a corporation of Delaware
Filed Jan. 11, 1965, Ser. No. 424,500
7 Claims. (Cl. 172—740)

This invention relates to adjusting means, particularly, for agricultural implements and the like. More specifically, the invention concerns means for adjusting an earthworking tool such as a plow bottom, relative to its support to vary the pitch or angle of penetration of the plow bottom.

An object of the invention is the provision of novel means for adjustably securing a tool to its support.

Another object of the invention is the provision, in a moldboard plow wherein a plow bottom is pivotally mounted on its support for angular adjustment to vary the angle of penetration thereof in the ground, of novel means for holding the plow bottom in a number of adjusted positions.

Other objects and advantages of the invention will become clear from the following detailed description when read in conjunction with the accompanying drawings, wherein:

FIGURE 1 is a view in side elevation of a moldboard plow bottom mounted on a supporting beam for adjustment by means incorporating the features of this invention;

FIGURE 2 is a view in perspective of the eccentric insert or collar forming a part of the connection of the plow bottom to its support and providing for adjustment thereof;

FIGURE 3 is a plan view of the member shown in FIGURE 2;

FIGURE 4 is an enlarged detail, partly in section, showing the means for adjusting and holding the plow bottom relative to its support;

FIGURE 5 is a section taken on the line 5—5 of FIGURE 4, illustrating one position of the eccentric adjusting member;

FIGURE 5a is a sectional detail similar to FIGURE 5 showing another position of adjustment with the adjusting member rotated about its axis 180° from the position of FIGURE 5;

FIGURE 6 is a sectional detail showing one position of the adjusting member after it has been removed from the bolt and reversed, bodily turning the collar or insert to reverse the positions of the faces thereof; and FIGURE 6a shows the insert revolved about its axis to another position of adjustment.

In the drawings, the numeral 10 designates a plow bottom including a share 11, a point 12 and a moldboard 13. A shoe 14 and a heel 15 are secured to the share 11 by bolts 16, the entire plow bottom 10 being pivotally mounted by means of a pivot bolt 17, upon the lower end of a supporting member in the form of a plow beam 18. It is frequently desirable to change the pitch of a plow bottom with respect to its supporting beams for the purpose of regulating the depth of penetration of the plow in the ground. This is accomplished by angularly adjusting the plow bottom 10 bodily with respect to beam 18 about the axis of pivot bolt 17. For this purpose, guide means is provided in the form of a slot 19 in shoe 14 arranged to register with a suitable bolt opening in beam 18 to receive a bolt 20.

Although the adjustment of a plow bottom with respect to its supporting beam is known, the means for effecting such adjustments and for holding the plow bottom in its selected adjusted position have not been satisfactory and the number of positions to which the plow could be adjusted has been limited. Furthermore, the frictional holding devices by which the position of the plow bottom has been maintained have not been sufficiently positive.

According to the present invention the plow beam 18 has been provided with an opening 21 to receive the shank of a bolt 22, threaded at one end to receive a nut 23 and having a head 24. Opening 21 communicates with an elongated opening or slot 25 in shoe 14, and to secure shoe 14, and therefore the entire plow bottom 10 to beam 18 in selected positions of angular adjustment of the plow bottom with respect to the supporting beam 18, an eccentric casting in the form of an insert or collar 26 is provided for reception in the slot 25 and for confinement between bolt head 24 and beam 18. Casting 26 forms a stepped insert including a central generally rectangular section 27 having one end 28 tapering and rounded to coincide with the rounded end of a raised eccentric portion 29 shaped to fit within the slot 25 and having its other end terminating short of the squared end of central section 27.

From the other side of central section 27 rises another elongated eccentric portion 30 having one end terminating short of the end 28 of the central section and its other end substantially coinciding with the squared end of the central section 27, as clearly shown in FIGURE 2. Eccentric portion 30 is also adapted to fit within the slot 25 upon reversal of the insert bodily to alternately or optionally dispose the faces of eccentric portions 29 and 30 to beam 18.

Insert 26 is provided with a bore 31 registerable with opening 21 to receive the shank of bolt 22 when one of the eccentric portions 29 or 30 is received in slot 25, the faces of central section 27 alternately engaging the outer face of shoe 14. It will be noted in FIGURE 3 that bore 31 is disposed adjacent one end of eccentric portion 29 and passes through eccentric portion 30 at a location medially of its ends to provide a differential between the eccentricities of portions 29 and 30.

In FIGURE 5 the eccentric portion 29 of insert 26 is shown received in slot 25 and the nut 23 tightened on bolt 22 to hold the plow bottom in an adjusted position with respect to beam 18. This position is represented in FIGURE 1 by the solid line position of the plow point 12 designated by the letter "a." An extreme position of adjustment of the plow bottom is indicated by the letter "d," and this is achieved by loosening nut 23 and revolving insert 26 about its axis to the position shown in FIGURE 5a.

Additional adjustments are provided by removing and reversing collar 26 until eccentric portion 30 is received in slot 25, as indicated in FIGURE 6, the corresponding position of the plow bottom being indicated at "b" in FIGURE 1. By revolving insert 26 to the position of FIGURE 6a, another position of adjustment of the plow bottom 10 is achieved and designated by the letter "c" in FIGURE 1. Upon tightening nut 23 the parts are securely held in the selected adjusted positions of the plow bottom 10.

It is believed that the construction and operation of the novel adjusting means of this invention should be clearly understood from the foregoing description. It should likewise be understood that the invention has been described in its preferred embodiment and that modifications may be made therein without departing from the spirit of the invention or the scope of the appended claims.

What is claimed is:

1. In an implement including a support member having an opening therein and a tool member on the support having an opening therein registrable with the opening in the support, one of said openings being substantially larger than the other, a bolt receivable in said openings having a shank conforming to the diameter of said other opening and a head, and a stepped collar having a bore therein to receive said shank, said collar having radially offset eccentric portions displaced in different directions from the axis of said bore, each of said eccentric portions being alternately receivable in said other opening upon reversing said collar and rotatable on said bolt to angularly adjust said tool member relative to said support member.

2. The invention set forth in claim 1, wherein said eccentric portions are radially displaced in opposite directions and are of substantially the same shape and size.

3. The invention set forth in claim 2, wherein said other opening is a slot and said eccentric portions are shaped to fit within said slot.

4. The invention set forth in claim 3, wherein said collar includes a central section separating said eccentric portions and engageable with the outer face of the adjacent of said members, one of said eccentric portions terminating at one end of said central section and the other eccentric portion terminating at the other end of said central portion.

5. The invention set forth in claim 4, wherein said bore passes through said collar adjacent one end of one of said eccentric portions and at a location spaced from each end of said other eccentric portion.

6. In an agricultural implement including a support having an opening therein, an earthworking tool pivotally connected to said support and having a slot therein registrable with said opening, a bolt received in said opening and slot accommodating angular adjustment of the tool relative to the support and having a head, and means for locking the tool in a plurality of adjusted positions comprising an insert having a bore to receive said bolt, said insert having a portion eccentric with respect to said bore receivable in said slot between the bolt head and the support to secure the tool to the support in one position of adjustment thereof and rotatable to reverse said eccentric portion in the slot to provide another position of adjustment of the tool, and another eccentric portion on said insert axially spaced and radially offset from the first mentioned eccentric portion and receivable in said slot upon removal and axial reversal of said insert to provide other positions of adjustment of the tool relative to the support.

7. The invention set forth in claim 6, wherein said insert includes a central section axially separating said eccentric portions and engageable with the outer face of said tool when either of said eccentric portions is received in said slot.

References Cited by the Examiner

FOREIGN PATENTS 2,136   5/1927   Australia.

ABRAHAM G. STONE, *Primary Examiner.*

R. CARTER, *Assistant Examiner.*